Jan. 29, 1963   R. B. STELZER   3,076,138
ELECTRICAL LOGGING
Filed Dec. 30, 1958   2 Sheets-Sheet 1
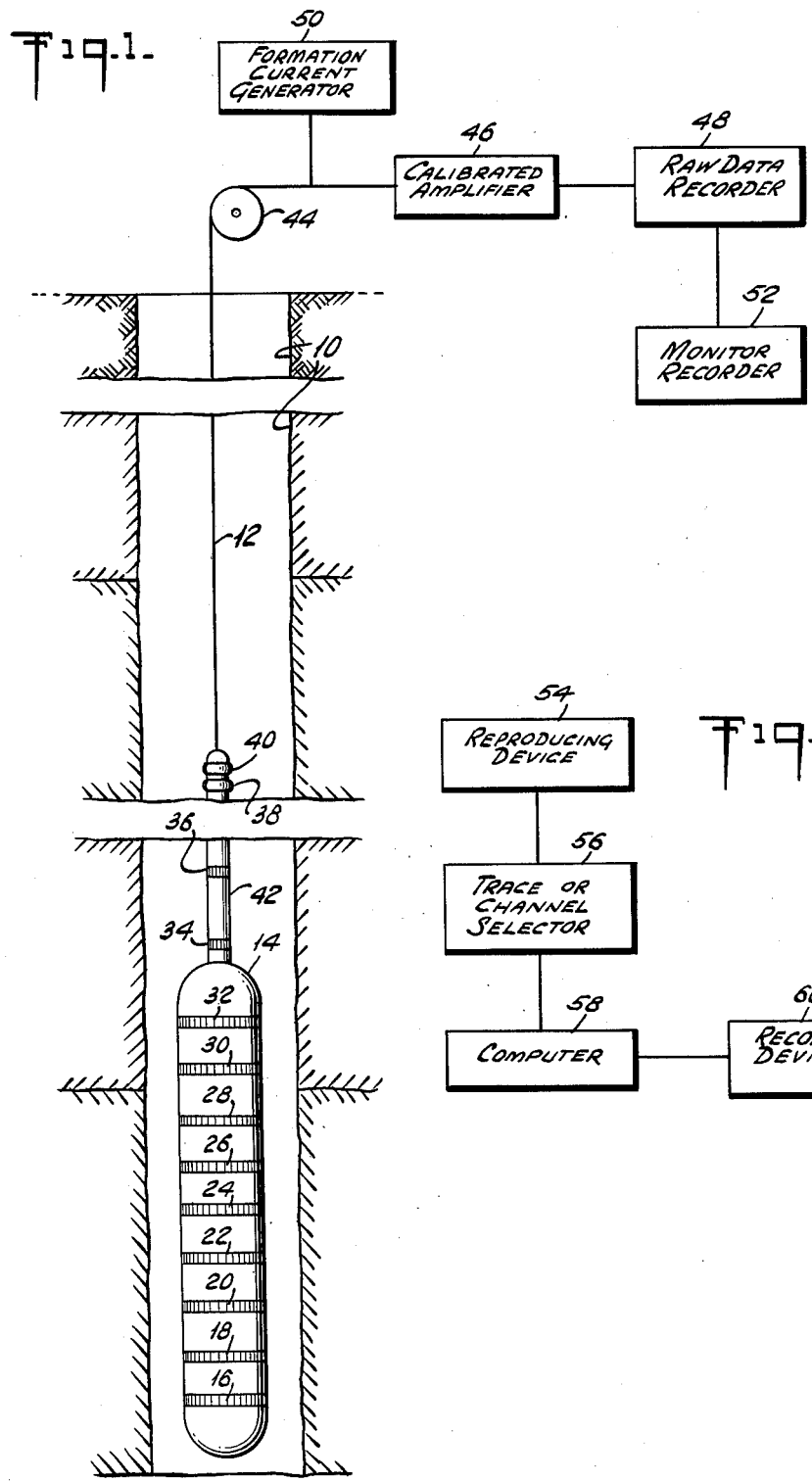

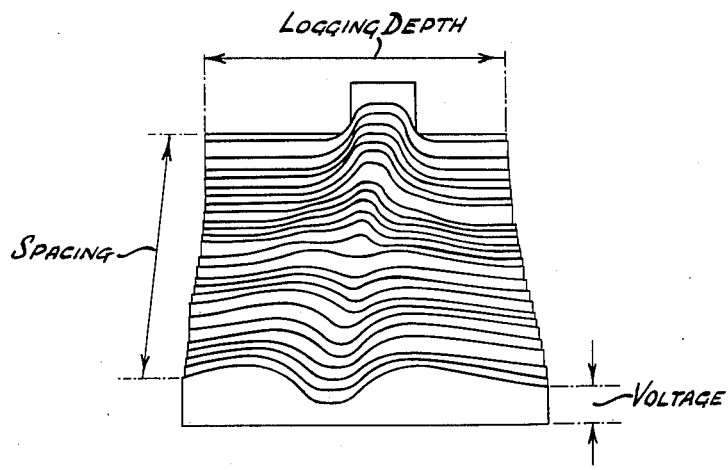
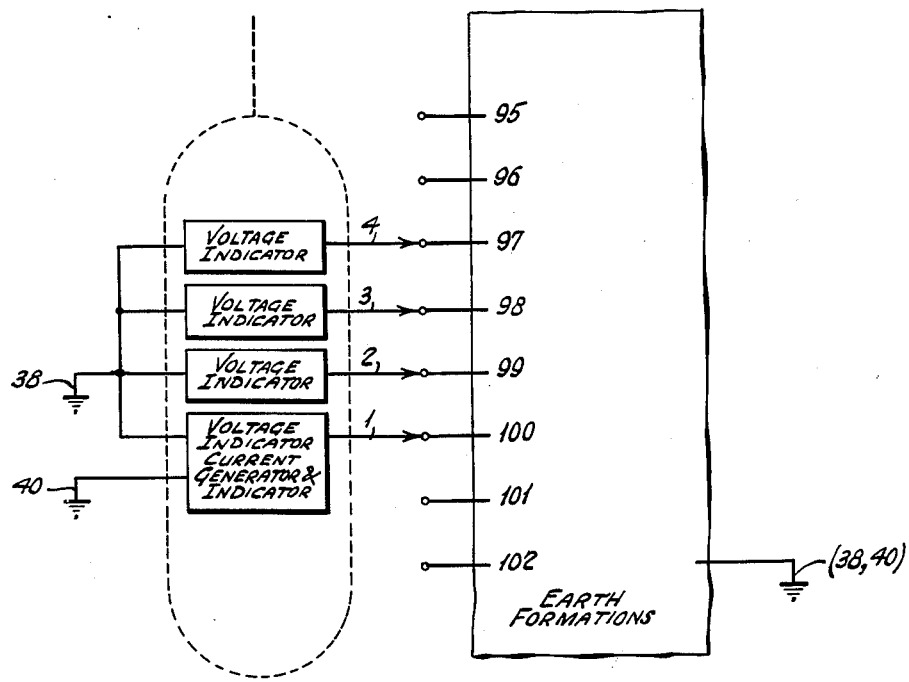

3,076,138
ELECTRICAL LOGGING
Roland B. Stelzer, Bellaire, Tex., assignor to Texaco Inc., a corporation of Delaware
Filed Dec. 30, 1958, Ser. No. 783,777
1 Claim. (Cl. 324—1)

This invention relates to electrical well logging and more particularly to an improved method and apparatus for determining the voltage distribution in or resistivity of subsurface formations.

Sufficient knowledge of the voltage distribution in subsurface formations resulting from artificially imposed current flow can lead to quantitative determinations of hydrocarbon saturations in porous media. For porous formations containing hydrocarbon gas or oil, it is known that the rock matrices generally are nonconductors of electricity. The property which allows for flow of electricity in such strata is provided by the conductivity and amount of water present within the interstices of the bulk formation. The electrical specific volume resistivity of bulk rock is recognized as an effective measure by means of which calculations may be made to determine water saturation as a percentage of porosity; or its complement, hydrocarbon saturation as a percentage of porosity.

A great variety of attempts have been made in past years to measure in situ the resistivity of earth formations penetrated by drill holes. In nearly every case the value of resistivity measured differs from the correct, or true, value due to inhomogeneity of resistivity with geometry. For example, the very existence of the drill hole containing a fluid having a value of resistivity other than that of the adjacent bulk formation, changes in formation resistivity with depth, and variations in the location of the measuring device with respect to formation boundaries alter the measured resistivity to a very marked degree.

In order to measure true resistivities in situ, and in an attempt to overcome the aforementioned difficulties, many types of logging devices have been developed. The most elementary arrangement comprises a pair of electrodes, a single electrode of the pair being mounted on a logging tool or sonde which is lowered into a well bore with a supporting, insulated conductor cable. Electric current from an external source is caused to flow from the single electrode through the formation to a second electrode of the pair located in the earth at a great distance from the single electrode, electrical conduction between the single electrode and the formation being provided by a relatively conductive drilling fluid. This so called single electrode device provides poor discrimination of resistivity with depth for most applications and is unduly influenced by the drill hole size and mud resistivity. The results obtained from this single electrode device are also peculiar to the size of the single electrode.

A second type of logging device employs two pairs of electrodes. Current is caused to pass between one pair of electrodes and a voltage difference is measured between the other pair. One form of this device has one electrode of each pair mounted, vertically displaced, on the logging tool with the remaining electrode of each pair located a far distance away from the region of the tool. The midpoint between the two electrodes mounted on the tool is considered to be the logging depth reference point. This device is called the two-electrode arrangement because two electrodes are located on the tool near the measuring reference depth. One of the major objections to its use, however, is its limited direct application to formations of thicknesses less than the linear distance between the two electrodes embracing the measuring point.

Another embodiment of the second type of logging device attempts to measure formation resistivity more effectively by having three electrodes of the two pairs of electrodes in vertical displacement on the logging tool with the fourth electrode a considerable distance away. In this arrangement the electrodes of one pair, either the current pair or the voltage pair, are disposed on the logging tool and separated from each other by a relatively small vertical distance, while one electrode of the other pair is disposed vertically above or below the aforementioned pair by a greater distance. For relatively thin formations, the response of this device is objectionable in that a zone of abnormally low response and one of abnormally high response is associated with each true anomaly. These additional characteristic anomalies lie above or below each true anomaly depending upon the relative vertical positioning of the pair of electrodes with respect to the remaining single electrode of the tool. When the pair is positioned below the third electrode of the tool, the device is sometimes referred to as a standard three electrode arrangement; when above, it is sometimes referred to as an inverted three electrode arrangement. These extraneous anomalies may often be confused with true anomalies and in any case invalidate any true measurements opposite the depths at which they occur.

A further embodiment of the second type of logging device has all four electrodes disposed symmetrically in vertical position about the measuring point. For thin beds the above mentioned abnormally high and low responses appear both above and below the true anomaly. Accordingly, it can be readily seen that in every case certain advantages are gained at the expense of new disadvantages.

Many hydrocarbon producing horizons or starta are thin beds with respect to the distance between electrodes on the tool and therefore lead to many of the objections mentioned above. Furthermore, in each of the above cases, the linear distance between electrodes mounted on the logging tool in ratio with the formation thickness is an important factor in evaluating the utility of measurements obtained. In general, however, the formation thickness of potential pay zones, i.e., oil bearing formations, is not known before the log is obtained. A desirable objective would be a system in which an optimum electrode arrangement and optimum electrode spacing could be used for each formation encountered. Usually a standard or conventional set of response curves of about three spacings during a single traverse of the drill hole has been obtained. This procedure, however, leaves much to be desired for the purpose of investigating resistivity in situ.

In order to provide additional useful resistivity information, many other types of electrode arrangements have been attempted involving as many as ten electrodes connected in several different ways. Each of these special devices has perculiar advantages to delineate stratographic anomalies, to obtain more useful data for definite types of matrices, to provide results less influenced by formations adjacent to the measuring depth, or to sense the resistivity in that portion of the formation invaded by drilling mud filtrate. Furthermore, for each of these special services the optimum distance between electrodes, for a given well, is related to formation thickness. When such additional special services are required, the idle rig time and hazards of losing control of the drilling mud due to lack of circulation are predominant economic and technical factors which generally limit the amount of data that may be obtained.

In every case, however, the desired value of apparent resistivity is proportional to the ratio of a voltage or a voltage difference to a current under conditions peculiar to a given logging arrangement. Stated in other terms, the apparent resistivity is proportional to a resistance function of the earth formations subject to certain spacial or electrical constraints peculiar to the logging arrangement. In the past such essential voltages or voltage differences and currents have been measured more or less directly under the conditions of the peculiar descriptive spacial or electrical requirements by more or less singular design of the logging system.

Accordingly, it is an object of this invention to provide an improved method of well logging.

It is another object of this invention to provide an electrical logging system which supplies sufficient information for producing logs for substantially all possible electrode arrangements conceivable from a survey during a single traverse of a logging tool in the drill hole.

It is a further object of this invention to provide an electrical logging system which supplies an original log having information such that those skilled in the art of log interpretation can produce therefrom concurrently or at any later time any conventional or special log having optimum electrode arrangements and spacings for substantially each stratum encountered throughout the depth of the drill hole.

It is still another object of this invention to provide an electrical logging system which supplies sufficient information of well bore voltage variations so that the required voltage variations which heretofore have been measured more or less directly and separately for nearly each and every conventional, focused and special electrical log may be calculated therefrom.

It is yet another object of this invention to provide an electrical logging system from which a three-dimensional surface may be found describing more fully than heretofore the voltage distribution or voltage gradients in the subsurface formations traversed by the borehole for a known current against logging depth, for given distances from the effective current electrode.

Still another object of this invention is to provide an electrical logging system from which a resistance matrix may be formed which more thoroughly depicts the electrical properties of the subsurface formation in the neighborhood of a well.

In accordance with this invention subsurface formations are investigated by determining substantially continuously the voltage distribution therein caused by electrical current from one electrode throughout a predetermined distance therefrom in the well bore.

The method of this invention provides data which is indicative of voltage distribution in a well bore, due to a known current flow, over a range of distances away from the current electrode substantially continuously with logging depth, from which certain characteristic anomalies may be associated with and indicative of certain anomalies in true formation resistivity.

In carrying out one aspect of the invention an elongated tool or sonde of a well logging system is moved through a borehole traversing subsurface formations, the sonde having a current electrode and means for detecting voltage distribution from the current electrode to a point at a given distance therefrom and the voltage distribution is recorded on a medium from which the recorded information can be readily reproduced, desired portions thereof selected and combined to provide a desired log of the borehole.

For a better understanding of the invention reference may be had to the accompanying drawing in which:

FIG. 1 is a vertical sectional view through a portion of the borehole illustrating an electrical logging system in accordance with this invention;

FIG. 2 illustrates in block form a system which may be used to produce substantially any desired electrical log from the data recorded by the system illustrated in FIG. 1;

FIG. 3 illustrates a plot of voltage distribution in a well bore for a known current; and FIG. 4 is a diagram illustrating one form of the electrical circuit of the logging system of the invention.

Referring in more detail to FIG. 1 of the drawing a borehole 10 is shown penetrating a plurality of subsurface formations. Suspended within the borehole 10 from a conductor cable 12 is a tool or sonde 14 having a plurality of potential electrodes 16, 18, 20, 22, 24, 26, 28, 30, 32, disposed thereon. Electrode 16 is preferably used also as a first current emitting electrode. Additional potential electrodes 34, 36, a reference electrode 38 and a second current emitting electrode 40 may be disposed on an insulated portion 42 of cable 12. If desired the metallic armour of cable 12 may be used as the reference electrode 38 and as the second current electrode 40. At the surface the cable 12 passes over a sheave or cable measuring drum 44 which serves to indicate or measure the amount of cable payed out and thereby the location of tool 14 in the borehole 10. The upper end of the cable 12 is connected to a calibrated amplifier 46, the output of which is connected to a raw data recorder 48. A generator 50, which is also connected to the upper end of the cable 12, supplies current to the subsurface formation through first current electrode 16 which current is returned to the generator 50 through the second current electrode 40. A monitor recorder 52 may be coupled to the raw data recorder 48, or to the output end of the amplifier 46.

In the operation of the electrical logging system illustrated in FIG. 1, a current, preferably alternating, of known intensity supplied by generator 50 is passed through the subsurface formations between the first current electrode 16 mounted on the logging sonde 14 and the distant return current electrode 40. The sonde 14 is moved through the borehole 10 and the voltage between each of the potential electrodes 16, 18, 20, 22, 24, 26, 28, 30, 32, 34, 36, and the reference electrode 38 and the current from electrode 16 are recorded by the raw data recorder 48 after passing through the calibrated amplifier 46. Potential electrodes 16 through 36 are suitably spaced on the sonde 14 and cable 12 to detect voltages which are a function of the subsurface formation resistivities and the current introduced into the formation throughout a predetermined distance, for example, from 1 foot to 20 feet, from the current electrode 16. The voltage differences between the reference electrode 38 and each of the potential electrodes 16 through 36 may be recorded simultaneously or in sequence on a medium in the raw data recorder 48. The medium is preferably of the type from which information recorded thereon can be readily reproduced, such as magnetic tape. The resulting record is a substantially continuous measurement of voltage distribution in the borehole over the predetermined distance plotted against depth, for example, the depth of the current electrode 16. When the recording medium of the raw data recorder is magnetic tape it is desirable to have a monitor recorder 52 for providing a visual record at the logging site. The signal applied to the monitor recorder 52 may preferably be derived from the recording medium of the raw data recorder 48 or alternatively the monitor recorder 52 may be connected to the output of the calibrated amplifier 46. The monitor recorder 52 may present a visual record of one or more of the voltages at the output of the calibrated amplifier 46.

To produce any of the conventional or special logs previously mentioned, the information contained in the log recorded by the well logging system of the present invention illustrated in FIG. 1 is fed through the system illustrated in FIG. 2. The system in FIG. 2 includes a reproducing device 54 which preferably has a separate channel for each of the voltage traces recorded by the raw data recorder 48. The reproducing device 54 may be connected directly to the raw data recorder 48 if a synthetic log is to be produced at the site of the raw data recorder 48. The output from the reproducing device 54 is connected to a trace or channel selector 56. A computer 58, which may be a conventional mixing circuit or a complex analog or digital computer, depending on the nature of the synthesis desired, receives the selected signals or voltages from the trace or channel selector 56 and supplies an output voltage representing a resultant log to a recording device 60 which is preferably of the visual type. The complexity of the equipment required is related to the complexity of the log desired. A self potential curve, the two electrode curve, the standard and inverted three electrode curves can be obtained without the use of complex equipment. In most cases the synthesis can be made by either digital or analog equipment. Generally, all logs can be synthesized by the simultaneous solution of $2n$ equations in $2n$ unknowns, substantially continuously with logging depth, where $n$ is the number of electrodes.

As will be explained more fully hereinafter, by a proper selection and combination of information from the raw data recorded by the system illustrated in FIG. 1 conventional or special logs may be synthesized which meet the optimum requirements of interpretation at a particular depth or formation. The degree of flexibility provided by the system of the invention is highly advantageous over prior art procedures wherein one is restricted to only those spacings and electrode arrangements which were chosen or standardized prior to logging the bore hole.

To transmit the voltages from each of the potential electrodes 16 through 36 to the surface equipment, the cable 12 may have a separate conductor connected between the surface equipment and each potential electrode. The cable 12 may also include a pair of conductors connected between the formation current generator 50 and the two current electrodes 16 and 40 and another conductor of cable 12 connected between the reference electrode 38 and the surface equipment. Where it is impractical to use a multiconductor cable for transmitting the voltages from the tool or sonde 14 to the surface equipment, a commutator-type switching device may be used in the sonde which may be driven in synchronism with a similar switching device at the surface to sequentially transmit voltages from the sonde 14 to the surface recorder 48. A suitable time constant may be used in the raw data recorder 48 for smoothing out the commutations. The rate of sampling of the voltages of each of the potential electrodes 16-36 must be sufficiently fast with respect to logging speeds so that the record of the voltage at each of the potential electrodes is substantially continuous with time. If desired, a carrier system, for example, of the type described in U.S. Patents Nos. 2,573,133 and 2,573,137, may be used wherein the voltages of each of the potential electrodes are impressed on a different one of a plurality of carrier waves, or two or more of the voltages each of different frequency may modulate each of the plurality of carriers. Furthermore, a transmission system may be used wherein the voltages or signals from the electrodes are transmitted to the surface by a combination of the sequential sampling and carrier methods.

The number of potential electrodes mounted on the sonde 14 may range from about 6 to 50 spaced throughout the predetermined distance from the current electrode and arranged in linear, logarithmic or reciprocal spacing. The number of potential electrodes is governed by the degree of accuracy desired for determining the voltage distribution within the predetermined distance in the subsurface formations. All of the potential electrodes are preferably disposed at and on one side of the sonde current electrodes 16, which electrode 16 is preferably the furthest electrode from the second current electrode 40. Voltages at points between the potential electrodes may be determined by interpolation. At any one of the potential electrodes which is not used to emit current into the subsurface formation, the spontaneous potential log may be derived by arranging for a suitable transmission channel to the surface recorder 48.

A plot of the voltage distribution or voltage gradients in the subsurface formations traversed by the borehole for a known current against logging depth, for a given distance from the sonde current electrode, may be made from the data recorded by the raw data recorder 48. A convenient way to visualize these data is to produce a three-dimensional plot having voltage, logging depth and electrode spacing, respectively, on the three principal axes as illustrated in FIG. 3 of the drawing. The surface defined by this plot may be formed by employing a linear scale for plotting voltage variations but where this is impractical the logarithm of the recorded voltages may be used. In FIG. 3, the logging depth and spacing scales are shown as linear and the voltage scale is logarithmic.

From such surfaces various surface characteristics or parameters peculiar thereto may be employed to determine resistivities in the broad neighborhood of the well bore.

For simplicity of explanation here and in the examples which follow, the procedure for determining the apparent resistivity of synthetic electrical logs may be divided into steps including the determination from the data of the raw data recorder of synthetic voltage and current values peculiar to the arrangement to be synthesized, the selection and combination of these synthetic voltage and current values which are pertinent to the arrangement to be synthesized, and the introduction of geometrical factors associated therewith.

Since the total information available from the raw data recorder 48 contains data from which substantially all conventional and special resistivity response curves may be obtained, by employing a computer, for example, a digital computer, such conventional and special logs, or other logs that may be considered from time to time, may be synthesized by first evaluating the synthetic electrode voltages or voltage differences and synthetic electrode currents that would exist under conditions peculiar to the logging arrangement to be synthesized by a substantially continuous solution of the following equation with depth.

$$[A]X[B]=[C]$$

wherein the matrix $[A]$, described more fully hereinafter, contains information from the raw data recorder 48 in addition to other information from the trace or channel selector 56 peculiar to the log to be synthesized, the matrix $[B]$ is a column matrix containing, from top to bottom, symbols for the unknown voltage values for the synthetic arrangement on electrodes 16, 18, 20, 22, 24, . . . 36 with respect to the reference electrode 38, and next symbols for the unknown current values for the synthetic arrangement emitted from electrodes 16, 18, 20, 24, . . . 36 and wherein matrix $[C]$ is a column matrix containing elements of value zero everywhere except for one arbitrary current value of the synthetic array employed as a normalizing current.

The solution to be made substantially continuously with depth is of the form $$[B]=[A]^{-1}\times[C]$$

wherein $[A]^{-1}$ is the inverse of $[A]$. From this solution, a synthetic electrode voltage value, or a difference in voltage values, may be made in terms of the synthetic normalizing current.

Based upon the definition of apparent resistivity, the apparent resistivity of the synthetic array is given by a linear combination of the normalized synthetic voltage values divided by the quantity $\frac{1}{4}\pi$ in product with a linear combination of the reciprocals of the absolute effective linear distances among the several electrodes. For a given synthetic arrangement, the normalized synthetic voltage values vary with depth and are explicitly evaluated in terms of the information from raw data recorder 48 in the solution of the matrix equation described above. The value of the quantity $\frac{1}{4\pi}$ in product with the appropriate linear combination of the reciprocals of the absolute effective linear distances among the several electrodes remains constant for a given synthetic arrangement and is evaluated once and for all by solution of a system of simultaneous equations similar to that described above but wherein matrix [A] is modified as described more fully hereinafter.

Thus the apparent resistivity of the synthetic array is given by $$\rho_a = \frac{\frac{1}{i_1}f(v\text{'s})}{\frac{1}{4\pi}f\left(\frac{1}{r_{jk}\text{'s}}\right)}$$

or in alternate form as employed in the examples given hereinafter, $$1 = \frac{\frac{1}{i_1}f(v\text{'s})}{\frac{\rho a}{4\pi}f\left(\frac{1}{r_{jk}\text{'s}}\right)}$$

wherein $\rho_a$ is the apparent resistivity to be evaluated for the synthetic arrangement, and wherein $i_1$ is the formation current from generator 50 emitted from electrode 16, $f(v\text{'s})$ refers to a suitable linear combination of the voltages measured at electrodes 16, 18, 20, . . . 36 in accordance with the field equipment described in connection with FIG. 1 and combined according to the prescription of the matrix equation identified above $$f\left(\frac{1}{r_{jk}\text{'s}}\right)$$

refers to a suitable linear combination of the reciprocals of the absolute effective linear distances among the electrodes 16, 18, 20, . . . 36 in accordance with the prescription of the modified matrix equation.

As will be apparent to those skilled in the art, the value of the arbitrary synthetic normalizing current may be taken as unity, the normalized synthetic voltage differences required for a given arrangement may be predetermined, and the quantity $$\frac{1}{4\pi}f\left(\frac{1}{r_{jk}\text{'s}}\right)$$

for the arrangement to be synthesized may be included in the original matrix equation to yield a comprehensive expression with solutions explicit in apparent resistivity.

Matrix [A], which is employed in the determination of synthetic voltage values, may be subdivided for convenience as follows:

$$[A] = \begin{bmatrix} A_{11} & A_{12} \\ A_{21} & A_{22} \\ A_{31} & A_{32} \end{bmatrix}$$

Submatrix [$A_{11}$] is a square unit matrix multiplied by the value $-1$ of $n^2$ elements, where $n$ is the number of electrodes on the equipment; thus electrodes 16, 18, . . . 36 constitute a set of $n$ electrodes.

Submatrix [$A_{12}$] is a square array of $n^2$ elements possessing symmetry in its main diagonal. The values of the elements of this submatrix are obtained from the raw data recorder 48 and change with logging depth. These values are independent of the arrangement to be synthesized. The general element on the main diagonal of this submatrix is of form $$\frac{r_{11}}{r_{jj}}\frac{v_1(z-r_{1j})}{i_1}$$

wherein $r_{11}$ is the effective radius of electrode 16, $r_{jj}$ is the effective radius of the $j^{th}$ electrode, $v_1(z-r_{1j})$ is the voltage obtained from recorder 48 at electrode 16 being that voltage value recorded when electrode 16 was at a subsurface depth $z-r_{1j}$, wherein $z$ is the subsurface depth of electrode 16 taken as a subsurface depth reference datum in making the synthesis and $r_{1j}$ is the absolute effective linear distance between electrode 16 and the $j^{th}$ electrode and $i_1$ is the current emitted from electrode 16 due to current generator 50. In a preferred arrangement, $r_{11} = r_{jj}$, by construction of the equipment. The general element lying above the main diagonal of submatrix [$A_{12}$] for the case of uniform spacing between electrodes 16, 18, 20 . . . 36 has the form $$\frac{v_{k-j+1}(z-r_{1j})}{i_1}$$

wherein $v_{k-j+1}$ is the voltage, starting the count with electrode 16 as number 1, on the $k^{th}-j^{th}+$first electrode, wherein $j$ is the row number of the submatrix, and $k$ is the column number, the quantity $(z-r_{1j})$ identifies the subsurface depth at which the above voltage is measured, wherein $z$ is the subsurface depth of electrode 16 taken as the subsurface depth reference datum in making the synthesis and $r_{1j}$ is the absolute effective linear distance between electrode 16 and the $j^{th}$ electrode and $i_1$ is the current emitted from electrode 16 due to current generator 50. In the event the electrodes are not uniformly spaced interpolation may be necessary. The general element of submatrix [$A_{12}$] lying below the main diagonal may be obtained by symmetry. The submatrix [$A_{12}$] therefore defines an independent set of transfer and driving point resistances as identified more explicitly hereinafter among the electrodes 16, 18, . . . 36 from which logs may be synthesized.

Submatrix $A_{21}$ consists of $s$ rows and $n$ columns, wherein $s$ is the number of voltage constraints or specifications used in defining the arrangement to be synthesized. It contains, in general, $+1$'s, $-1$'s, and 0's.

Submatrix $A_{22}$ is a null matrix of $s$ rows and $n$ columns.

Submatrix $A_{31}$ is a null matrix of $n'-s$ rows and $n$ columns.

Submatrix $A_{32}$ consists of $n-s$ rows and $n$ columns. It contains, in general, $+1$'s, $-1$'s, and 0's. In this submatrix the constraints or specifications on electrode currents defining the arrangements to be synthesized are placed.

It can be shown that for any physically realizable synthetic arrangement, the number of independent voltage constraints plus the number of independent current constraints totals precisely $n$, where $n$ is the number of electrodes 16, 18, . . . 36. The submatrices $$\begin{bmatrix} A_{21} & A_{22} \\ A_{31} & A_{32} \end{bmatrix}$$

therefore define an array of $n$ rows and $2n$ columns peculiar to the electrode arrangement to be synthesized and independent of the raw data recorded with recorder 48.

For the simple cases of the single electrode, two electrode, and inverted three electrode logs, for example, the normalized synthetic voltages to be calculated are precisely the normalized values measured in the field. Accordingly, $s$ is zero, [$A_{21}$] and [$A_{22}$] are non-existent, [$A_{31}$] is null, and [$A_{32}$] is the unit matrix. For the more complex logs, such as focused arrangements, the general case of voltage constraints, current constraints, or combinations thereof exist.

Thus by means of the above-described matrix equation, the normalized synthetic voltage and current value at each of the $n$ electrodes is determined from the information of raw data recorder 48 for any given logging arrangement that may be desired from time to time. From these values, the pertinent synthetic electrode voltage-to-current ratios are selected for forming a given synthetic log. Such synthetic normalized voltage and current values are precisely equivalent to the values which would be measured by more or less direct means had such a given logging arrangement been designed and constructed with more or less singularity of purpose. As a subsequent step in the disclosure of this method, a geometrical factor or proportionality factor is evaluated which when combined with the synthetic voltage and current values that have been determined as described hereinabove from the information of raw data recorder 48 for a given logging arrangement to be synthesized, yields the apparent resistivity peculiar to that arrangement.

In order to determine the elements from which the linear combination $$\frac{1}{4\pi} f\left(\frac{1}{r_{jk}'s}\right)$$

is comprised for a given arrangement, the before-identified matrix equation is employed with the exception that matrix [A] is modified as follows: All submatrices of modified matrix [A] are identical to those described above, except for submatrix [$A_{12}$]. The modified submatrix [$A_{12}$] is again a square array of $n^2$ elements possessing symmetry in its main diagonal. For this case, however, the values of the elements are independent of the information from the raw data recorder and do not change with logging depth; instead, they depend entirely upon the arrangement to be synthesized. Each element of this submatrix is multiplied by the quantity $\frac{1}{4}\pi$. As will be appreciated by those skilled in the art and depending upon the type of computing means utilized, an alternate form in which the implied further multiplication by $\rho_a$ is effected may be convenient, where $\rho_a$ is the unknown apparent resistivity for the synthetic arrangement and which becomes explicitly evaluated upon final solution of the equations. In the examples given hereinafter this alternate form is employed so that each element of modified submatrix [$A_{12}$] may be considered multiplied by the quantity $\rho_a/4\pi$.

The general element on the main diagonal of modified submatrix [$A_{12}$] is of the form $$\frac{1}{r_{jj}} - \frac{1}{r_{j,38}}$$

wherein $r_{jj}$ is the effective radius of the $j^{th}$ electrode and $r_{j,38}$ is the absolute effective linear distance between the $j^{th}$ electrode and the reference voltage electrode such as electrode 38 of FIGURE 1. It is noted that for practical purposes the value of the element on the main diagonal is simply $1/r_{jj}$ since the term $1/r_{j,38}$ is negligibly small compared therewith. The general element lying above the main diagonal is of the form $$\frac{1}{r_{jk}} - \frac{1}{r_{j,38}}$$

wherein $r_{jk}$ is the absolute effective linear distance between the $j^{th}$ and $k^{th}$ electrode tabulated such that, starting the count with electrode 16 of FIGURE 1 as number 1, $j$ is the row number of modified submatrix [$A_{12}$] and $k$ is the column number, and wherein $r_{j,38}$ is the absolute effective linear distance between the $j^{th}$ electrode and the reference voltage electrode such as electrode 38 of FIGURE 1. The general element lying below the main diagonal is obtained by symmetry. It should be noted that a certain degree of flexibility, commensurate with that used in conventional logging practice is available with respect to the location of reference voltage electrode 38. For example, if, in a given matrix element, $1/r_{jk}$ is very large as compared with $1/r_{j,38}$, the value of the matrix element is insensitive to the precise location of reference voltage electrode 38. A further aspect of flexibility is apparent in that the role of the reference voltage electrode need not necessarily be played by electrode 38, but can be chosen as any electrode sufficiently far removed from the lower-lying electrodes utilized in forming the synthetic log. Furthermore, the role played by reference voltage electrode 38 may by computational means be effectively shifted to other electrodes if desired.

In order to describe in more detail computations which provide synthesized logs, examples will be presented in connection with a simplified form of the logging system of this invention as illustrated in modified schematic form in FIGURE 4, wherein the logging depth locations at which the logging sonde is in communication with earth formations by virtue of the conducting drilling mud are indicated by equally spaced hypothetical earth terminals 102, 101, 100 . . . 95, and wherein the current electrode on the sonde such as that shown in FIGURE 1 may in this case be considered as being electrode 1, with additional electrodes 2, 3, and 4 corresponding to additional electrodes on the sonde. Reference current electrode 40 and reference potential electrode 38 are shown as being in electrical communication with a remote point of the earth formation. Although in practical application the logging sonde is generally moved upward past the stationary earth in a continuous manner, to provide greater clarity in the explanation discrete depth locations are used in the examples. Furthermore, in order to simplify the examples, it will be assumed that synthetic electrical log responses for only one position of the logging sonde in the hole will be required; namely for that position in which sonde electrode 1 is in contact with earth terminal 100, although it will be readily understood that the procedure can be made substantially continuous with depth. For further simplification, it will be assumed that the absolute effective linear distances among the sonde electrodes are uniform and equal in magnitude to the linear distances among the hypothetical earth terminals. Furthermore, the effective radii of all sonde electrodes are assumed to be of the same value and the location of reference voltage electrode 38 is sufficiently far removed from sonde electrodes 1, 2, 3, and 4 so that its influence on the value $$f\left(\frac{1}{r_{jk}'s}\right)$$

is negligible.

To determine the resistance matrix of a desired portion of a subsurface formation for a logging depth at which sonde electrode 1 is in contact with formation electrode 100 we may write the equation $$[R(100)] = \begin{bmatrix} R_{11}(100) & R_{12}(100) & R_{13}(100) & R_{14}(100) \\ R_{21}(100) & R_{22}(100) & R_{23}(100) & R_{24}(100) \\ R_{31}(100) & R_{32}(100) & R_{33}(100) & R_{34}(100) \\ R_{41}(100) & R_{42}(100) & R_{43}(100) & R_{44}(100) \end{bmatrix}$$

$$= \begin{bmatrix} \frac{v_1}{i_1}(100) & \frac{v_1}{i_2}(100) & \frac{v_1}{i_3}(100) & \frac{v_1}{i_4}(100) \\ \frac{v_2}{i_1}(100) & \frac{v_2}{i_2}(100) & \frac{v_2}{i_3}(100) & \frac{v_2}{i_4}(100) \\ \frac{v_3}{i_1}(100) & \frac{v_3}{i_2}(100) & \frac{v_3}{i_3}(100) & \frac{v_3}{i_4}(100) \\ \frac{v_4}{i_1}(100) & \frac{v_4}{i_2}(100) & \frac{v_4}{i_3}(100) & \frac{v_4}{i_4}(100) \end{bmatrix}$$

where the terms in each of the first columns relate to the voltage on the four or $n$ sonde electrodes with current emission from current electrode 1 for sonde at depth 100; the second column relates to the voltages on the four or $n$ electrodes respectively with current emission from electrode 2, for sonde at depth 100, etc. In the field of electrical engineering, the elements on the main diagonal are commonly referred to as driving point resistances and the remaining elements are called transfer resistances. Furthermore, the earth formations are generally believed to be comprised of a linear bilateral continuum, for which case the [R] matrix is symmetrical in its main diagonal, which is an expression of the concept of reciprocity familiar in electrical engineering work. Ideally this set of values could be obtained by making such voltage and current measurements with specially designed equipment. In accordance with the method of this invention, however, this set of data is available from the output of the raw data recorder. More specifically, submatrix [$A_{12}$] is equal to this resistance matrix in accordance with the description herein above given. Thus $$[R(100)] = [A_{12}(100)] = \begin{bmatrix} \frac{v_1}{i_1}(100) & \frac{v_2}{i_1}(100) & \frac{v_3}{i_1}(100) & \frac{v_4}{i_1}(100) \\ \frac{v_2}{i_1}(100) & \frac{v_1}{i_1}(100-r_{12}) & \frac{v_2}{i_1}(100-r_{12}) & \frac{v_3}{i_1}(100-r_{12}) \\ \frac{v_3}{i_1}(100) & \frac{v_2}{i_1}(100-r_{12}) & \frac{v_1}{i_1}(100-r_{13}) & \frac{v_2}{i_1}(100-r_{13}) \\ \frac{v_4}{i_1}(100) & \frac{v_3}{i_1}(100-r_{12}) & \frac{v_2}{i_1}(100-r_{13}) & \frac{v_1}{i_1}(100-r_{14}) \end{bmatrix}$$

From the independent set [R] synthetic logs can be made by linear combinations under conditions defining the electrode arrangement to be synthesized.

The synthetic arrangement in general is different from the electrode arrangement employed in obtaining the raw data. This difference is due to requirements peculiar to the arrangement to be synthesized. Certain conditions of equality in voltages between a pair of electrodes, for example, may be required.

For the synthetic log, the following nomenclature is used. $V_1, V_2, V_3 \ldots V_n$ are the magnitudes of voltage differences, for example, as between electrodes 16 and 38, 18 and 38, 20 and 38 . . . $n$ and 38 of the system shown in FIG. 1 and $I_1, I_2, I_3, \ldots I_n$ are the magnitudes of currents emitted, positive, negative or zero, from electrodes 16, 18, 20, . . . $n$, respectively It may be shown that $$V_j = \sum_{k=1}^{k=n} R_{jk} I_k$$

This is a general equation for voltage at any of the $n$ electrodes. According to the concept of superposition, the voltage $V_j$ is made up of the sum of contributions caused by each of the $n$ currents taken separately. Thus $n$ such voltage equations may be written. In this set of equations there will, in general, be $2n$ unknowns. These are the $n$ values of V, and the $n$ values of I. The corresponding set of $2n$ equations required to solve this set uniquely consist of the $n$ equations, shown above, identifying the $n$ voltages at the electrodes, plus $n-1$ boundary conditions or constraints, and one current parameter used in normalizing. Since all apparent resistivities are proportional to a ratio of voltage to current, the selection of one current value for normalizing is allowable and arbitrary. For any unique, physically realizable electrode arrangement, there will always be $n-1$ boundary conditions or constraints. Thus for the general case the $2n \times 2n$ array can be formed and a unique solution is assured. To synthesize a given electrode arrangement from the raw data this set of equations is solved substantially continuously with depth, thereby identifying values of V and I for the synthesized configuration. From these values the apparent resistivity may be evaluated and plotted versus depth.

Referring again to FIG. 4, this figure illustrates the depth position of the sonde in the well and the measuring circuit for determining $R_{41}(100)$, $R_{31}(100)$, $R_{21}(100)$, and $R_{11}(100)$ which are simply equal to $$\frac{v_4}{i_1}(100), \frac{v_3}{i_1}(100), \frac{v_2}{i_1}(100)$$

and $$\frac{v_1}{i_1}(100)$$

respectively, i.e., the measured voltage at sonde electrodes 4, 3, 2, and 1, respectively, divided by the current at sonde electrode 1, for that depth of the logging sonde at which sonde depth reference electrode 1 is at earth formation terminal 100.

In order to determine from the recorded raw data the resistance which a three electrode logging arrangement having potential electrodes at points 2 and 3 and a current electrode at point 1 would measure at depth 100, the following equation is used:

$$\frac{v_2-v_3}{I_1}=\frac{v_2-v_3}{i_1}=R_{21}-R_{31}$$

This resistance is determined simply without the use of the hereinabove matrices because $V_2 = v_2$, etc. However, it can be shown that even this simple solution can be obtained by using the more complex format.

$$\begin{bmatrix} -1 & 0 & 0 & 0 & R_{11} & R_{12} & R_{13} & R_{14} \\ 0 & -1 & 0 & 0 & R_{21} & R_{22} & R_{23} & R_{24} \\ 0 & 0 & -1 & 0 & R_{31} & R_{32} & R_{33} & R_{34} \\ 0 & 0 & 0 & -1 & R_{41} & R_{42} & R_{43} & R_{44} \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \times \begin{bmatrix} V_1 \\ V_2 \\ V_3 \\ V_4 \\ I_1 \\ I_2 \\ I_3 \\ I_4 \end{bmatrix} = \begin{bmatrix} 0 \\ 0 \\ 0 \\ 0 \\ I_1 \\ 0 \\ 0 \\ 0 \end{bmatrix}$$

in which matrix [A] is of the form $$\begin{bmatrix} A_{11} & A_{12} \\ A_{21} & A_{22} \\ A_{31} & A_{32} \end{bmatrix}$$

wherein [$A_{11}$] is the unit matrix multiplied by $-1$, [$A_{12}$] is the R matrix from the field log evaluated for depth 100, [$A_{21}$] is nonexistent because there are no voltage constraints in the three electrode arrangement being synthesized, [$A_{22}$] is therefore a nonexistent null matrix, [$A_{31}$] is a null matrix, and [$A_{32}$] is the unit matrix since no current constraints are employed in the system being synthesized and the V's and I's are hypothetical, peculiar to the synthesized log.

When this matrix is multiplied out it becomes a system of simultaneous equations written out as follows:

(1) $-V_1+0+0+0+I_1R_{11}+I_2R_{12}+I_3R_{13}+I_4R_{14}=0$
(2) $0-V_2+0+0+I_1R_{21}+I_2R_{22}+I_3R_{23}+I_4R_{24}=0$
(3) $0+0-V_3+0+I_1R_{31}+I_2R_{32}+I_3R_{33}+I_4R_{34}=0$
(4) $0+0+0-V_4+I_1R_{41}+I_2R_{42}+I_3R_{43}+I_4R_{44}=0$
(5) $0+0+0+0+I_1+0+0+0=I_1$
(6) $0+0+0+0+0+I_2+0+0=0$
(7) $0+0+0+0+0+0+I_3+0=0$
(8) $0+0+0+0+0+0+0+I_4=0$

It can be seen that Equations 6, 7, and 8 show that $I_2=I_3=I_4=0$, Equation 5 shows that $I_1=I_1$, which is an identity for normalizing, and Equations 2 and 3 reduce to:

$$-V_2+I_1R_{21}=0$$
$$-V_3+I_1R_{31}=0$$

Therefore, $$\frac{V_2-V_3}{I_1}=R_{21}-R_{31}$$

which is the same resultant as the hereinabove more simply obtained resultant.

Thus it is seen that the proper resistance function for the determination of the three electrode apparent resistivity is evaluated from the data of the raw data recorder.

As hereinabove outlined, the apparent resistivity of the synthetic log is proportional to such a resistance function. The process of evaluating the proportionality constant for this arrangement having been isolated as a separate step for clarity in presentation is next employed in accordance with the hereinbefore defined procedure involving the modified submatrix $[A_{12}]$. Using the alternate form of modified submatrix $[A_{12}]$, the above-solved equation is again written with the alternate form of modified submatrix $[A_{12}]$ substituted for the $[R]$ matrix. In accordance with the assumption that the reference voltage electrode is far removed from sonde electrodes 1, 2, 3, and 4, the modified submatrix is of the form $$\frac{\rho_a}{4\pi} \begin{bmatrix} \frac{1}{r_{11}} & \frac{1}{r_{12}} & \frac{1}{r_{13}} & \frac{1}{r_{14}} \\ \frac{1}{r_{21}} & \frac{1}{r_{22}} & \frac{1}{r_{23}} & \frac{1}{r_{24}} \\ \frac{1}{r_{31}} & \frac{1}{r_{32}} & \frac{1}{r_{33}} & \frac{1}{r_{34}} \\ \frac{1}{r_{41}} & \frac{1}{r_{42}} & \frac{1}{r_{43}} & \frac{1}{r_{44}} \end{bmatrix}$$

Furthermore, employing symmetry and noting the assumption of uniform sonde electrode size and spacing, modified $[A_{12}]$ is given by $$\text{Modified } [A_{12}] = \frac{\rho_a}{4\pi} \begin{bmatrix} \frac{1}{r_{11}} & \frac{1}{r_{12}} & \frac{1}{r_{13}} & \frac{1}{r_{14}} \\ \frac{1}{r_{12}} & \frac{1}{r_{11}} & \frac{1}{r_{12}} & \frac{1}{r_{13}} \\ \frac{1}{r_{13}} & \frac{1}{r_{12}} & \frac{1}{r_{11}} & \frac{1}{r_{12}} \\ \frac{1}{r_{14}} & \frac{1}{r_{13}} & \frac{1}{r_{12}} & \frac{1}{r_{11}} \end{bmatrix}$$

Substituting this modified submatrix $[A_{12}]$ for R in the above equation results in $$\begin{bmatrix} -1 & 0 & 0 & 0 & \frac{\rho_a}{4\pi r_{11}} & \frac{\rho_a}{4\pi r_{12}} & \frac{\rho_a}{4\pi r_{13}} & \frac{\rho_a}{4\pi r_{14}} \\ 0 & -1 & 0 & 0 & \frac{\rho_a}{4\pi r_{12}} & \frac{\rho_a}{4\pi r_{11}} & \frac{\rho_a}{4\pi r_{12}} & \frac{\rho_a}{4\pi r_{13}} \\ 0 & 0 & -1 & 0 & \frac{\rho_a}{4\pi r_{13}} & \frac{\rho_a}{4\pi r_{12}} & \frac{\rho_a}{4\pi r_{11}} & \frac{\rho_a}{4\pi r_{12}} \\ 0 & 0 & 0 & -1 & \frac{\rho_a}{4\pi r_{14}} & \frac{\rho_a}{4\pi r_{13}} & \frac{\rho_a}{4\pi r_{12}} & \frac{\rho_a}{4\pi r_{11}} \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \times \begin{bmatrix} V_1 \\ V_2 \\ V_3 \\ V_4 \\ I_1 \\ I_2 \\ I_3 \\ I_4 \end{bmatrix} = \begin{bmatrix} 0 \\ 0 \\ 0 \\ 0 \\ I_1 \\ 0 \\ 0 \\ 0 \end{bmatrix}$$

which upon solution and selection of the pertinent second and third equations yields $$-V_2 + \frac{\rho_a}{4\pi r_{12}} I_1 = 0$$

$$-V_3 + \frac{\rho_a}{4\pi r_{13}} I_1 = 0$$

and upon combination yields $$\frac{V_2 - V_3}{I_1} = \frac{\rho_a}{4\pi}\left(\frac{1}{r_{12}} - \frac{1}{r_{13}}\right)$$

Thus by employing the synthetic normalized voltage values as an intermediate step the two solutions may be combined as follows:

$$\frac{v_2 - v_3}{i_1} = \frac{V_2 - V_3}{I_1} = \frac{\rho_a}{4\pi}\left(\frac{1}{r_{12}} - \frac{1}{r_{13}}\right)$$

to produce a prescription from which the apparent resistivity for the three electrode arrangement may be formed from the information of the raw data recorder by equating the extreme left and right members as follows:

$$\rho_a = \frac{\frac{1}{i_1}(v_2 - v_3)}{\frac{1}{4\pi}\left(\frac{1}{r_{12}} - \frac{1}{r_{13}}\right)}$$

which is of the form $$\frac{\frac{1}{i_1} f(v's)}{\frac{1}{4\pi} f\left(\frac{1}{r_{jk}'s}\right)}$$

as identified hereinbefore and will be recognized as the conventional expression for the three electrode arrangement. Although the solution of the equation has been given for sonde depth at 100, it is clear that such solutions may be made substantially continuously with logging depth. For sonde at subsurface depth z, 100 say, the resultant apparent resistivities are conventionally plotted against a subsurface depth $$z - \frac{r_{12} + r_{13}}{2}$$

or as an example at depth $$100 - \frac{r_{12} + r_{13}}{2}$$

These computations merely illustrate how the general format quickly provides the simple equations required. However, for more complicated requirements, this format is essential and can be used to rapidly solve situations which are not as obvious as the situation in the above example. A machine computer can readily solve simple or difficult situations if they are set up on the same format.

In order to illustrate a more difficult situation a four electrode arrangement will be considered wherein the potential electrodes are at points 2 and 3 and the current electrodes are at points 1 and 4, current flowing in at point 1 and out at point 4. In the conventional system, due to current flow at point 1 alone $$\frac{V_2 - V_3}{I_1} = R_{21} - R_{31}$$

and due to current flow at point 4 alone $$\frac{V_3 - V_2}{I_4} = R_{34} - R_{24}$$

Since $I_1 + I_4 = 0$, due to current of opposite polarities flowing at electrodes 1 and 4 in the conventional system subsequently to be synthesized, the value $$\frac{V_2 - V_3}{I_1}$$

resulting from the simultaneous current flow is equal to the sum $(R_{21} - R_{31}) + (R_{34} - R_{24})$, and finally the apparent resistivity for the four electrode arrangement is known to be given by $$\rho_a = \frac{2\pi(V_2 - V_3)}{I_1} \cdot \frac{1}{\frac{1}{r_{12}} - \frac{1}{r_{13}}}$$

This resultant may also be determined by the method of this invention by using the matrix format as follows:

$$\begin{bmatrix} -1 & 0 & 0 & 0 & R_{11} & R_{12} & R_{13} & R_{14} \\ 0 & -1 & 0 & 0 & R_{21} & R_{22} & R_{23} & R_{24} \\ 0 & 0 & -1 & 0 & R_{31} & R_{32} & R_{33} & R_{34} \\ 0 & 0 & 0 & -1 & R_{41} & R_{42} & R_{43} & R_{44} \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 1 & 0 & 0 & 1 \end{bmatrix} \times \begin{bmatrix} V_1 \\ V_2 \\ V_3 \\ V_4 \\ I_1 \\ I_2 \\ I_3 \\ I_4 \end{bmatrix} = \begin{bmatrix} 0 \\ 0 \\ 0 \\ 0 \\ I_1 \\ 0 \\ 0 \\ 0 \end{bmatrix}$$

wherein the equation is identical with that employed for the three electrode arrangement with the exception that a statement of the current constraint, $I_1+I_4=0$ is contained in the last row. This equation may be reduced to $$-V_2+I_1R_{21}-I_1R_{24}=0$$
$$-V_3+I_1R_{31}-I_1R_{34}=0$$

and therefore, $$\frac{V_2-V_3}{I_1} = (R_{21}-R_{24})-(R_{31}-R_{34})$$
$$= (R_{21}-R_{31})+(R_{34}-R_{24})$$

wherein the $R_{jk}$'s are known from the information available from the raw data recorder.

Next upon substitution of modified submatrix $[A_{12}]$ for $[R]$ the solution yields $$-V_2+I_1\frac{\rho_a}{4\pi r_{12}}-I_1\frac{\rho_a}{4\pi r_{24}}=0$$

$$-V_3+I_1\frac{\rho_a}{4\pi r_{13}}-I_1\frac{\rho_a}{4\pi r_{34}}=0$$

and therefore, $$\frac{V_2-V_3}{I_1}=\frac{\rho_a}{4\pi}\left[\left(\frac{1}{r_{12}}-\frac{1}{r_{24}}\right)-\left(\frac{1}{r_{13}}-\frac{1}{r_{34}}\right)\right]$$

Upon the assumption of equally spaced electrodes, $$r_{12}=r_{34} \text{ and } r_{13}=r_{24}$$

the apparent resistivity is given by $$\rho_a=\frac{2\pi(V_2-V_3)}{I_1}\cdot\frac{1}{\frac{1}{r_{12}}-\frac{1}{r_{13}}}$$

and will be recognized as the conventional expression for the four electrode arrangement. The synthetic value $$\frac{V_2-V_3}{I_1}$$

being equal to the sum $(R_{21}-R_{31})+(R_{34}-R_{24})$, may be expressed in terms of the information from raw data recorder 48. Thus the apparent resistivity and sonde depth 100 is given by $$\rho_a(100)=\frac{\frac{1}{i_1}[v_2(100)-v_3(100)+v_2(100-r_{13})-v_3(100-r_{12})]}{\frac{1}{4\pi}\left[\left(\frac{1}{r_{12}}-\frac{1}{r_{24}}\right)-\left(\frac{1}{r_{13}}-\frac{1}{r_{34}}\right)\right]}$$

The procedure for synthesizing still another log may be outlined for which the schematic drawing of FIGURE 4 is considered to have in addition to electrodes 1, 2, 3, and 4, additional voltage electrodes 5, 6, 7 ... $n$, numbered in continuing sequence. For this logging system terminal pairs 1 and 7, 2 and 6, and 3 and 5 are electrically connected together, current is emitted at 4 and an amount of current is emitted from pair 1 and 7 to provide a potential at 2 and 6 equal to the potential at 3 and 5. Thus the voltage and current constraints definitive of this arrangement and which are formulated in submatrices $[A_{21}]$ and $[A_{32}]$ are as follows:

$$V_1-V_7=0 \quad V_3-V_5=0 \quad I_2+I_6=0 \quad I_4=I_4$$
$$V_2-V_6=0 \quad V_2-V_3=0 \quad I_3+I_5=0$$

The ratio $V_2/I_4$ may be calculated with only the knowledge of the R matrix, which can be obtained from the raw data, together with the modified matrix $[A_{12}]$ as hereinbefore defined, as follows by using the matrix format:

$$\begin{bmatrix} A_{11} & & & & & & A_{12} & & & & \\ 1 & 0 & 0 & 0 & 0 & 0 & -1 & 0 & \ldots & 0 & 0 & 0 & 0 & 0 & 0 & \ldots & 0 \\ 0 & 1 & 0 & 0 & 0 & -1 & 0 & 0 & \ldots & 0 & 0 & 0 & 0 & 0 & 0 & \ldots & 0 \\ 0 & 0 & 1 & 0 & -1 & 0 & 0 & 0 & \ldots & 0 & 0 & 0 & 0 & 0 & 0 & \ldots & 0 \\ 0 & 1 & -1 & 0 & 0 & 0 & 0 & 0 & \ldots & 0 & 0 & 0 & 0 & 0 & 0 & \ldots & 0 \\ 0 & 0 & 0 & 0 & 0 & \ldots & 0 & 0 & 1 & 0 & 0 & 0 & 1 & 0 & 0 & \ldots & 0 \\ 0 & 0 & 0 & 0 & 0 & \ldots & 0 & 0 & 0 & 1 & 0 & 1 & 0 & 0 & \ldots & 0 \\ 0 & 0 & 0 & 0 & 0 & \ldots & 0 & 0 & 0 & 0 & 1 & 0 & 0 & 0 & \ldots & 0 \\ 0 & 0 & 0 & 0 & 0 & \ldots & 0 & 0 & 0 & 0 & 0 & 0 & 0 & 1 & \ldots & 0 \\ \vdots & & & & & & & & & & & & & & & & \vdots \\ 0 & 0 & 0 & 0 & 0 & \ldots & 0 & 0 & 0 & 0 & 0 & 0 & 0 & 0 & \ldots & 1 \end{bmatrix} \times \begin{bmatrix} V_1 \\ V_2 \\ V_3 \\ \vdots \\ V_n \\ I_1 \\ I_2 \\ I_3 \\ I_4 \\ \vdots \\ I_n \end{bmatrix} = \begin{bmatrix} 0 \\ 0 \\ 0 \\ \vdots \\ 0 \\ 0 \\ 0 \\ I_4 \\ 0 \\ \vdots \\ 0 \end{bmatrix}$$

Accordingly, it can be seen that any type of log for a borehole may be calculated, preferably, with the use of a computer, from the R matrix containing information obtained from the basic logs provided by the teaching of this invention.

It can be readily seen that in this manner any of the conventional or special logs may be produced for any length of borehole at any time subsequent to the recording of the raw data by the recorder 48 of the electrical logging system of the present invention illustrated in FIG. 1. Furthermore, it can be seen that any and all logs can be obtained from data recorded during a single traverse of a borehole and that the logging system of this invention produces the maximum amount of electrical logging information with a minimum amount of time in the borehole. The logs which may be synthesized are not limited to the type which can be obtained by running the tool or sonde on the well bore center line. Wall contact type logs, of the type described in U.S. Patents 2,669,688, 2,669,690, and 2,712,629, may also be synthesized by providing means in the borehole to urge the electrode arrangement against the wall of the borehole and recording voltage and current values as described hereinabove in connection with the apparatus illustrated in FIG. 1 of the drawing to thus produce conventional two and three electrode contact type logs or the more specialized contact logs such as the focussed type contact log.

It should be understood that additional potential electrodes may be added to the sonde 14 of FIG. 1 below the current electrode 16, however, these additional electrodes are not necessary since the information which these electrodes can provide may be obtained by utilizing the reciprocity theorem as applied to electrical networks, as is well known in the art.

Furthermore it should be understood that in one embodiment of the invention in which electrode 16 is used as a current electrode and sequential measurements of voltage are made at electrodes 16, 18 ... $n$, cyclicly, the reciprocal arrangement will produce the identical result, i.e., using electrode 16 as the vo'tage electrode and sequencing the role of current electrode from electrode 16, 18 ... $n$ cyclicly.

Furthermore, in another embodiment of this invention, the sonde of the apparatus may have a current electrode adapted to move throughout the borehole to a plurality of points and a single potential electrode adapted to move with respect to the current electrode at each of the plurality of points in the direction of the axis of the borehole. In this manner the potential electrode moving with respect to the current electrode for any given distance can pick up voltages throughout that distance which can be continuously recorded. This embodiment alternatively may include a reciprocal electrode arrangement wherein the voltage electrode is fixed and the current electrode slides or moves with respect to the voltage electrode.

Although the invention has been described in connection with a logging system having a sonde suspended in the borehole by means of a cable as shown in FIG. 1 it should be noted that the logging system of the invention may be used during the borehole drilling process. In the logging while drilling embodiment of the present invention, the current and potential electrodes may be embedded in an insulating coating disposed on the external surface of one or more drill collars or drill pipe sections and the recording and current generating devices, suitably electrically connected to the electrodes, may be located in a capsule attached to the lower end of the drill stem of the borehole drilling device in a manner such as that disclosed in U.S. application having Serial No. 677,969, filed by R. J. Clements, B. D. Lee, and R. B. Stelzer on August 13, 1957. In another embodiment of the invention the entire logging system may be lowered into a borehole on a wire line attached to a capsule or container housing the recording and current generating devices and carrying on the outer surface thereof the current and potential electrodes.

Obviously, many modifications and variations of the invention as hereinabove set forth may be made without departing from the spirit and scope thereof and therefore only such limitations should be imposed as are indicated in the appended claim.

I claim:

An electrical well logging system comprising means including a pair of current electrodes spaced a predetermined fixed distance apart for passing an electrical current therebetween through the formation surrounding the well, means including one of said current electrodes and a plurality of axially spaced apart additional electrodes for picking up potential differences between each of the electrodes of said pick up means and a remote reference point resulting from said current, means to record said potential differences and the magnitude of said current, means to vary the depth of the assembly of said one current and additional electrodes, means to reproduce said recorded potential differences, means to select at least one of said reproduced voltages, means to translate said at least one of the selected voltages in accordance with predetermined voltage and current constraints identifying a given logging electrode arrangement, and means to record the resulting combination of voltages and currents to thereby produce a synthetic log.

References Cited in the file of this patent
UNITED STATES PATENTS

| | | |
|---|---|---|
| 2,393,009 | Chun | Jan. 15, 1946 |
| 2,415,364 | Mounce | Feb. 4, 1947 |
| 2,742,605 | McMillan | Apr. 17, 1956 |
| 2,776,402 | Kokesh | Jan. 1, 1957 |
| 2,782,364 | Shuler et al. | Feb. 19, 1957 |
| 2,882,988 | Dobrin | Apr. 21, 1959 |
| 2,884,589 | Campbell | Apr. 28, 1959 |
| 2,920,266 | Owen | Jan. 5, 1960 |